United States Patent [19]
Rainer et al.

[11] 3,909,455
[45] Sept. 30, 1975

[54] CATALYST AND PROCESS FOR MAKING SAME
[75] Inventors: Norman B. Rainer; Peter Allen Wilson, both of Richmond, Va.
[73] Assignee: Philip Morris Incorporated, New York, N.Y.
[22] Filed: May 1, 1973
[21] Appl. No.: 356,094

[52] U.S. Cl. ............. 252/466 J; 423/247; 423/600
[51] Int. Cl............................................ B01j 11/22
[58] Field of Search........... 252/466 J; 423/600, 247

[56] References Cited
UNITED STATES PATENTS

| | | | |
|---|---|---|---|
| 1,936,936 | 11/1933 | Fogler | 252/466 J |
| 3,014,860 | 12/1961 | Douwes et al. | 252/466 J |
| 3,432,443 | 3/1969 | Davies et al. | 252/466 J |
| 3,444,256 | 5/1969 | Engelhard | 252/466 J |
| 3,600,429 | 8/1971 | Kronig et al. | 252/466 J |

*Primary Examiner*—Arthur P. Demers

[57] ABSTRACT

A catalyst is provided which is remarkably effective for catalyzing the oxidation of carbon monoxide to carbon dioxide at ambient conditions. This catalyst is prepared by contacting high surface area alumina with a solution of a cobalt compound (e.g., cobalt nitrate), adsorbing the cobalt compound on the alumina, removing the solvent, and thereafter heating the cobalt-treated alumina at a temperature of 400°C to 1,300°C in an oxygen-providing environment.

10 Claims, No Drawings

CATALYST AND PROCESS FOR MAKING SAME

BACKGROUND OF THE INVENTION

1. Field of the Invention

This invention relates to a catalyst which is uniquely effective for the oxidation of carbon monoxide at ambient conditions, and to a process for producing such catalyst. It is particularly related to a novel catalytic composition comprising a high surface area alumina support containing less than about 15 weight percent cobalt deposited thereon, which catalyst is prepared by a novel process to be hereinafter described in detail.

2. The Prior Art

The conventional material which has heretofore been commonly used for the removal of carbon monoxide in gas masks is the so-called "Hopcalite", which is a mixture of manganese oxide, copper oxide, silver oxide, nickel oxide and cobalt oxide. This material converts carbon monoxide to carbon dioxide at ambient conditions. Other known substances for this purpose, i.e., oxidation of carbon monoxide at ambient conditions, include silver permanganate, palladium chloride and iodine pentoxide. The disadvantage of these materials — apart from their high cost — is that the oxidation reaction proceeds in a stoichiometric manner, hence utilizing their total combined oxygen for effective oxidation. Accordingly, their capacity is inherently limited. Moreover, once used, they cannot readily be regenerated and reused for further oxidation. This, naturally, limits their potential application for their intended purpose — particularly in commercial operations.

Other catalysts capable of converting carbon monoxide to carbon dioxide are the precious metals, e.g., platinum and palladium. However, these compounds are only effective at relatively high temperatures which obviously limits their applications.

Although catalyst systems made from cobalt and aluminum compounds are known (see, e.g., U.S. Pat. Nos. 1,936,936 and 1,937,689), these catalysts have been found to be unsatisfactory for the oxidation of carbon monoxide at room temperature.

SUMMARY OF THE INVENTION

High surface area alumina is contacted with a solution of a cobaltous compound (e.g., cobaltous nitrate) and on heating forms a cobalt aluminate spinel on the alumina surface. After depositing from about 0.5 to about 15 weight percent cobalt on the alumina, the solvent is removed and the resulting cobalt-treated alumina is calcined at a temperature of from about 400°C to about 1,300°C in an oxygen-providing atmosphere for at least about 30 minutes.

DETAILED DESCRIPTION OF THE INVENTION

It has been unexpectedly discovered that high surface area alumina having less than about 15 weight percent cobalt deposited thereon is remarkably effective for oxidizing carbon monoxide at room temperature. The term "high surface area" alumina as employed herein refers to alumina having a surface area of from about 100 to about 400 square meters per gram.

The starting alumina is preferably employed in the form of granules having a mesh size (U.S. Sieve Series, ASTM E-11-61) of from about 4 to about 200. Also, the alumina which is particularly suitable as a starting material for the purpose of this invention should preferably contain less than about 10 weight percent $SiO_2$ and will generally contain less than about 2 weight percent of all other non-volatile impurities. Particularly preferred alumina granules will have good cohesive strength and high resistance to attrition.

Cobalt compounds useful in the preparation of the catalysts of this invention are those wherein the cobalt is in a divalent state and can be dissolved in a suitable solvent. Exemplary compounds include cobaltous nitrate, cobaltous halide (chloride, bromide and iodide), cobaltous salts of organic carboxylic acids such as oxalic, acetic, butyric, caprylic, and other acids, compounds of cobalt with organic chelating agents, e.g., cobaltous acetylacetonate, cobaltous 8-hydroxyquinolate, and cobalt coordination complexes having volatile ligands such as ammonia, ethylenediamine, water and the like.

It has been found that metal ions of the first transition series, such as, e.g., zinc, copper, nickel and manganese, enhance the activity of the catalyst, particularly at the lower levels of cobalt content of the catalyst. Such metal ions may be employed in amounts of less than about 1 percent, based on the dry weight of catalyst, and are most conveniently added by mixing a compound of such metal with the solution of cobalt compound.

The cobalt compound is applied to the alumina in the form of an aqueous solution or an organic solution of the cobalt compound. An organic solution is preferred and when using an organic solution of a soluble cobaltous compound, it is generally preferred to use water-miscible organic solvents which permit the cobalt compound to be adsorbed onto the alumina in such a manner that the adsorbed cobalt compound cannot be readily removed from the alumina by contact with the same liquid. Exemplary organic solvents which are suitable in forming organic solutions of cobalt compounds for use herein include saturated aliphatic alcohols containing 1 to about 7 carbon atoms, preferably 1 to 4 carbon atoms, such as, for example, methanol, ethanol, isopropanol and isobutanol; saturated aliphatic ketones containing 3 to about 6 carbon atoms, preferably 3 to about 4 carbon atoms, such as, for example, acetone and methyl ethyl ketone; ethers such as tetrahydrofuran; amines such as methylamines and ethanolamines; amides such as dimethyl formamide; dimethyl sulfoxide; phosphines, or mixtures of said solvents. Acetone has been found to be a particularly effective solvent and is therefore preferred for preparing the organic solution of the cobalt compounds contemplated in this invention. Water immiscible organic solvents such as cyclohexanone can be utilized but they are slightly more difficult to process.

The adsorption of cobalt is a surface mechanism and the first amounts of cobalt compound contacting the alumina is adsorbed on its surface. Up to two percent by weight cobalt is adsorbed depending on the molecular structure of the cobalt compound in solution and the surface area and pore structure of the alumina. This adsorbed cobalt compound cannot be removed by further solvent washing. It is essential to the invention to have this layer of adsorbed cobalt on the alumina. Once this adsorbed layer is formed, additional cobalt can be added, e.g., by evaporation techniques, up to 15 percent by weight and after calcining give the active catalyst.

The catalyst of this invention may be prepared by contacting the alumina with the solution of cobalt compound continuously or in batch preferably by surrounding the alumina with the liquid. Thus, for example, the cobalt compound solution may be passed through a column containing the alumina in order to adsorb the cobalt compound on the alumina. Alternately, a cobalt solution can be evaporated while in contact with the alumina. The treated alumina, i.e., alumina having cobalt compound adsorbed thereon is then heated to evaporate the solvent therefrom and the solvent-free alumina is thereafter calcined at a temperature of from about 400°C to 1,300°C and preferably from about 600°C to about 1,000°C, and more preferably, from about 700°C to about 900°C for at least about 30 minutes in an oxygen-providing atmosphere whereby the cobalt compound deposited on the alumina is converted to cobalt aluminate spinel. As is apparent to the artisan, the time and temperature of the calcining operation should be empirically determined to optimize the conditions for a particular run. Accordingly higher temperatures can result in shorter times for calcining.

The conditions required during the aforesaid operations must be judiciously selected so that the resulting catalyst contain from about 0.5 to about 15 weight percent elemental cobalt. If the cobalt content of the catalyst is below about 0.5 weight percent, then there is little if any catalytic activity. On the other hand, the catalytic activity rapidly diminishes when the cobalt content of the catalyst exceeds about 15 weight percent. The active catalyst containing the prescribed amounts of cobalt has essentially the same total surface area as the initial alumina.

Following contacting the alumina with the cobalt compound, the alumina takes on a color which may be pink, rose-pink, brownish red, blue or green, depending on the nature and the amount of cobalt compound deposited thereon. These colors are generally strongly adsorbed on the alumina and cannot be removed by washing with the solvent employed to prepare the cobalt compound solution.

As was previously mentioned, the calcining operation is carried-out in an oxygen-providing atmosphere such as, for example, oxygen or air, or in a gaseous atmosphere which provides the necessary oxygen during the calcining operation such as, for example, nitrous oxide, nitrogen dioxide and chlorine oxide. The term "oxygen-providing" gas as employed herein refers to a gaseous substance which will, at the temperature of calcining employed herein, give oxygen to the material which is being calcined. For the purpose of this invention, oxygen, air and nitrous oxide are particularly preferred. It is essential, of course, to maintain sufficient oxygen during the calcining of the treated alumina so as to insure efficient conversion to the novel cobalt aluminate having a spinel structure and to avoid complete depletion of the oxygen from the oxygen-providing atmosphere before complete conversion to the spinel.

When calcined in the manner hereinbefore described, the activated cobalt aluminate spinel catalyst will always have a blue color. Although calcining at a temperature of from about 400°C to about 1,300°C for a period of at least about 30 minutes will convert the cobalt compound, longer calcining time of up to about 10 hours does not adversely affect the resulting catalyst.

After conclusion of the calcining operation, the catalyst is cooled, preferably in the presence of oxygen or the oxygen-providing atmosphere and then kept in such an atmosphere or an inert atmosphere free from moisture until it is ready for its intended use. When air is utilized during cooling precautions should be taken to remove its moisture content since moisture will cause loss of the activity of the catalyst.

Unlike prior cobalt oxide-alumina catalysts, which are of black or brown color, the catalyst of this invention is essentially blue in color. The blue color is attributable to a cobalt aluminate spinel structure wherein $CO^{++}$ ions are surrounded by a tetrahedral arrangement of $O^{--}$ ions. The cobalt aluminate spinel structure is an integral part of the alumina substrate. It cannot be effectively removed from the alumina by chemical treatment including leaching with strong acids such as aqua regia. By way of comparison, the cobalt of prior art cobalt oxide-alumina catalysts can be removed by said acid treatments.

When the cobalt content of the present catalyst exceeds 15% by weight, the color of the product becomes black and it does not possess catalytic activity. Although we do not wish to be bound by theoretical interpretations, it is felt that, as the cobalt atoms become more closely spaced on the alumina surface, and particularly when said atoms occupy more than about 15% of the available surface of the alumina, cobalt oxide forms on the alumina surface instead of the cobalt aluminate spinel needed for catalytic activity. The cobalt aluminate form that exists on the alumina of the catalyst of this invention is not the same as ordinary cobalt aluminate. It has been found, for example, that pure cobalt aluminate powder of high surface area and subjected to the same heat treatment with an oxygen-providing atmosphere as used in the process of this invention, has no catalytic activity for the conversion of CO to $CO_2$ at room temperature. It has also been found that, if the alumina is replaced in the practice of the process of this invention by other high surface area materials such as silica gel and porous glass, no catalytic activity is produced.

The role of the alumina is therefore more than merely to provide a high surface area substrate for the cobalt. It is felt that the alumina interacts with the cobalt aluminate spinel to provide a special electronic environment, and molecular pathways serving to establish a supply of weekly bound molecular oxygen at the catalyst surface. Evidence for the presence of labile molecular oxygen in the catalyst comes from two sources. It has been found for example, that if a freshly prepared catalyst is subjected to high vacuum conditions, oxygen is lost and the resultant product is no longer catalytically active. Spectrographic evidence has also been obtained to confirm the oxygen loss.

Such spectrographic evidence was obtained by using a Beckman DK-2 spectrophotometer equipped with a reflectance attachment. Samples of the catalyst and the alumina starting material were placed in the sample and reference compartments respectively, in cylindrical silica cells having 10 mm path length. Spectra were recorded from the near infrared to the ultraviolet region. Major bands in the reflectance spectra are in accord with the spectra for pure cobalt aluminate ($CoAl_2O_4$) as reported by J. H. Ashley and P. C. H. Mitchell, J. Chem. Soc. A 1968, 282 (1968). When the spectra for the active catalyst were compared with the spectra of a catalyst which was deactivated by exposure to high vacuum, it was found that the inactive material has a distinct band at 5,000–5,500 $cm^{-1}$, whereas the active material has no band in this region. However, in the regions of 10,000–12,500 cm$^{-1}$ and 20,000–35,000 cm$^{-1}$, the active material has a much larger band (more highly reflecting) than inactive material.

The catalyst of this invention is particularly useful in gas masks and, in general, for the oxidation of carbon monoxide to carbon dioxide at room temperature as well as at elevated temperature. Some catalytic compositions prepared in accordance with this invention also find usefulness as components of cigarette filters, and in the air oxidation of ammonia to nitric acid at an elevated temperature of about 600°C.

The catalyst of this invention has a high life expectancy before losing its catalytic activity, i.e., it becomes "poisoned". Once poisoned, its activity may be restored and the catalyst regenerated by calcining in the presence of an oxygen-providing gas in the manner hereinbefore described.

The present invention will now be illustrated by the following examples. It must be emphasized, however, that these examples are presented merely to facilitate further understanding of the invention without intending to limit its scope.

All percentages in these examples are on weight basis.

EXAMPLE 1

Ten grams of activated alumina of 40/80 mesh (Type RA-1, made by the Reynolds Metals Co.) having a surface area of approximately 200 square meters per gram was placed in a 5/16 inch I.D. glass buret. A 2% solution of cobaltous nitrate $(Co(NO_3)_2 \cdot 6H_2O)$ in acetone was introduced into a buret and allowed to flow through the alumina. The cobalt compound was selectively adsorbed by the alumina, as evidenced by the fact that the alumina assumed a pink color which gradually descended the column as a sharply defined band, and the initially emergent acetone solution was colorless. The treatment was continued until the effluent had about the same red-purple color as the feed solution. Fresh actone was then introduced into the column to wash out unadsorbed cobalt nitrate until the acetone effluent was practically colorless.

The pink colored alumina granules were then removed from the column and dried at 100°C. until substantially all the acetone was removed therefrom. The dried granules were then placed in a "Vycor" tube and this tube was heated in a furnace at 800°C. for two hours while a stream of nitrous oxide was continuously passed through the tube at a rate of 7.5 cc per minute. The resultant blue colored catalyst was found to contain 0.53 percent cobalt, ascertained by determining the amount of cobalt removed from the acetone solution.

The effectiveness of the catalyst for the oxidation of carbon monoxide was determined in the following manner.

Three hundred mg. of the catalyst granules were placed in a 50 mm section of 4 mm I.D. glass tubing. The sample was constrained to occupy the center 40 mm of the tube length by means of two 5 mm length porous filter plugs (constructed of cellulose acetate crimped tow) inserted into each end of the glass tube. This assembly was inserted into a gas line leading to the sample inlet port of a gas chromatographic analyzer.

A gas mixture consisting of 2.5 percent CO, 7.5 percent $CO_2$, 13.0 percent $O_2$ and 77.0 percent nitrogen was passed through the catalyst in this tube at room temperature, atmospheric pressure and at the rate of 10 ml. per minute (0.389 mg. of CO per minute). The effluent gas from this tube was periodically analyzed for its CO content by gas chromatographic analysis.

The results of this example indicated that even after passing the aforesaid gas mixture through the catalyst for approximately 8 hours (and hence oxidizing 186 mgs. of carbon monoxide), the catalyst was still capable of converting all the CO in the gas mixture to $CO_2$.

EXAMPLE 2

The procedure of Example 1 was repeated except that the catalyst was subjected to a second treatment with cobaltous nitrate solution and then re-heated as described in Example 1. The resultant catalyst contained 0.75 weight percent cobalt and was tested as in Example 1 for the oxidation of CO. The results indicated that even after the catalyst has removed (oxidized) 210 mg. of CO, it was still 80 percent efficient, i.e., could oxidize 80 percent of the carbon monoxide in the gas stream to carbon dioxide.

EXAMPLE 3

The procedure of Example 1 was repeated except that the cobalt compound was a saturated solution of cobaltous acetylacetonate in tetrahydrofuran. The cobalt content of the resulting catalyst was 0.83 percent and, even after converting 210 mg. of CO to $CO_2$, its catalytic efficiency as described in Example 1 was still at 90 percent.

EXAMPLE 4

Employing 40/80 mesh Alcoa G220 alumina, having a surface area of 400 m$^2$/gm, catalyst were made from both acetone and water solutions of cobaltous nitrate. In each case, carefully weighed quantities of the alumina and cobaltous nitrate were placed in beakers. Enough solvent was added to solubilize the cobaltous nitrate, and the solvent was subsequently evaporated off at 110°C while agitating the alumina to insure even deposition of the cobaltous nitrate. In this manner, exactly 2 percent by weight of cobalt was deposited on each of the two samples. Both dried samples had a pink-blue color.

The samples were then placed in a Vycor tube maintained at 800°C, and were held in the tube for 70 minutes, during which time a stream of $N_2O$ passed through the tube. The Vycor tube was allowed to cool to room temperature while the $N_2O$ still flowed, and the catalysts, having bright blue color were immediately placed in vials and sealed.

Employing the general test method of Example 1, 177 mg. of the catalyst made via acetone solution was found to retain 100 percent activity after removal of 102 mg. of CO. A sample of 205 mg. of the catalyst prepared via aqueous solution was found to retain 100 percent activity after removal of 76 mg. of CO.

EXAMPLE 5

Employing the 40/80 mesh alumina of Example 1, carefully weighed amounts of cobaltous nitrate and alumina were mixed in beakers with enough water to completely dissolve the cobaltous nitrate. The water was then evaporated, thereby depositing a known amount of cobalt on the alumina. The treated alumina samples thus prepared were then subjected to the activating heat treatment of Example 1. The catalysts were tested for their ability to oxidize carbon monoxide at room temperature (75°F) by the method of Example 1. The data obtained is presented in Table I. In each case there is reported the number of milligrams of carbon monoxide passed through the catalyst sample before the sample loses 10 percent of its initial activity. Since the test method initially provided 100 percent removal of the carbon monoxide passed through the bed of catalyst, loss of 10 percent of catalyst activity, for the purpose of their example is taken to correspond to a transmission of 10 percent of the CO content of the test gas mixture through the catalyst sample undergoing testing.

TABLE I

| Weight % Cobalt On Alumina | Milligrams CO Passed Through The Catalyst Before the Catalyst Loses 10% of Its Activity |
| --- | --- |
| 2 | 11 |
| 5 | 22 |
| 7 | 111 |
| 9 | 135 |
| 11 | 150 |
| 13 | 160 |
| 14 | 110 |
| 15 | 16 |
| 17 | 6 |

The data of Table I illustrate the effects of the upper limit of 15 percent cobalt content in the catalyst of this invention.

In general, and particularly at the lower levels of cobalt content, the use of an organic solvent such as acetone, produces more active catalyst than obtained with the use of water as the solvent. This is why the catalyst of Example 1, at 0.53 percent cobalt content, is more active than the catalyst prepared in this example.

EXAMPLE 6

Alumina granules of 40/80 mesh size (Type RA-1, made by the Reynolds Aluminum Co., Richmond, Va.) having a surface area of 200 square meters per gram were treated with a solution of cobaltous nitrate in acetone by the process of Example 1. The dried, pink-colored granules were then heat activated by the method of Example 1 except that oxygen was used instead of $N_2O$, and a series of activation temperatures were used in different experiments.

The testing of each sample was carried out by the test method of Example 1 wherein the CO-containing gas mixture was continuously passed through the catalyst until about 2 percent of the CO entering the bed of catalyst granules begins to emerge from the downstream side of the bed. The data obtained are presented in Table 2.

TABLE 2

| Temperature of Activation | Number of Milligrams of CO Passed Through The Catalyst before it Loses 2% of Its Activity |
| --- | --- |
| 400 °C | 19 |
| 500 | 31 |
| 600 | 40 |
| 700 | 54 |
| 800 | 82 |
| 900 | 83 |
| 1000 | 82 |
| 1200 | 45 |
| 1300 | 15 |

What is claimed is:

1. A room temperature catalyst capable of converting carbon monoxide to carbon dioxide in the presence of ambient oxygen comprising an alumina support having a surface area of about 100 to about 400 square meters per gram and from about 0.5 to about 15 percent by weight cobalt adsorbed on said alumina in the form of a blue cobalt aluminate spinel having labile molecular oxygen, said catalyst containing substantially no moisture.

2. A catalyst as in claim 1 in the form of granular material having a mesh size of from about 4 to about 200.

3. A catalyst as in claim 1 where the alumina contains less than about 10 percent by weight of $SiO_2$.

4. A process for the production of a catalyst which process comprises:
   a. contacting an alumina support having a surface area of from about 100 to about 400 square meters per gram with a solution of a cobaltous compound until from about 0.5 to about 15 weight percent cobalt has been deposited on said alumina,
   b. removing the solvent from said treated alumina,
   c. heating the resultant treated alumina in a stream of an oxygen-providing gas at a temperature of from about 400°C to about 1,300°C for at least 30 minutes, and
   d. cooling the resultant treated alumina in a substantially moisture-free atmosphere to room temperature.

5. The process of claim 4 wherein said cobaltous compound solution is a solution of cobalt in an organic solvent.

6. The process of claim 4 wherein said oxygen-providing gas is selected from the group consisting of air, oxygen and nitrous oxide.

7. The process of claim 4 wherein said oxygen-providing gas is nitrous oxide.

8. The process of claim 4 wherein said treated alumina is heated at a temperature of from about 600°C to about 1,000°C.

9. The process of claim 5 wherein said treated alumina is heated at a temperature of from about 600°C to about 1,000°C.

10. The process of claim 9 wherein said solvent is acetone and said oxygen-providing atmosphere is nitrous oxide.

* * * * *